T. D. MONTGOMERY.
WELDING CONTROLLER.
APPLICATION FILED APR. 17, 1916.
1,278,368.
Patented Sept. 10, 1918.
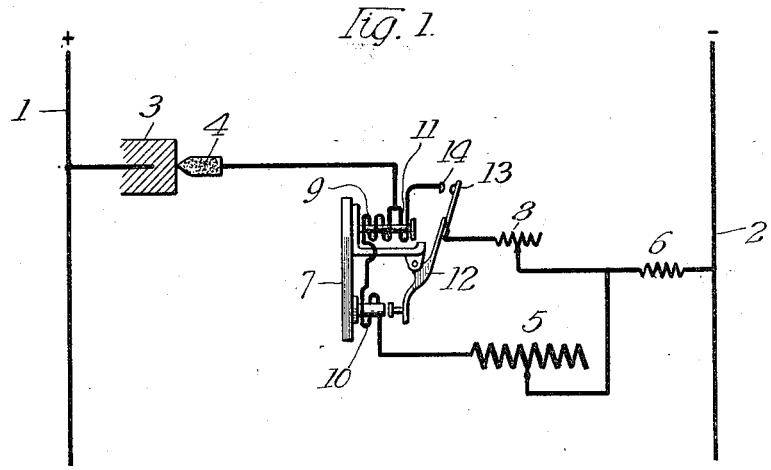
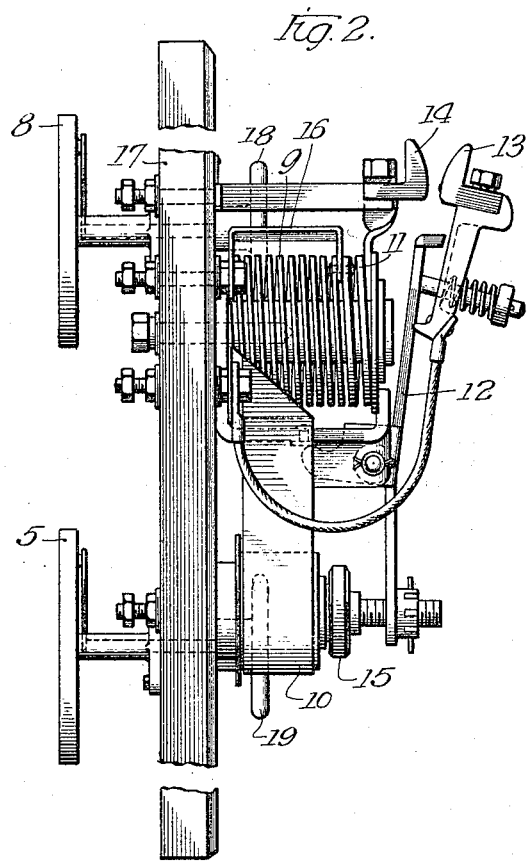
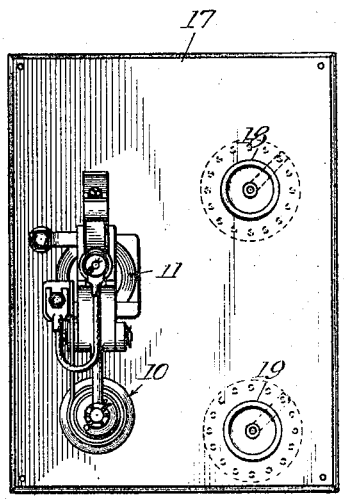
Witnesses:
Inventor
Theodore D. Montgomery
Edwin B. H. Tower Jr. Atty.

ns to the supply mains and the welding electrodes as illustrated in Fig. 1 will first be described.

UNITED STATES PATENT OFFICE.

THEODORE D. MONTGOMERY, OF EAST ORANGE, NEW JERSEY, ASSIGNOR TO THE CUTLER-HAMMER MFG. CO., OF MILWAUKEE, WISCONSIN, A CORPORATION OF WISCONSIN.

WELDING-CONTROLLER.

1,278,368.

Specification of Letters Patent.

Patented Sept. 10, 1918.

Application filed April 17, 1916. Serial No. 91,637.

*To all whom it may concern:*

Be it known that I, THEODORE D. MONTGOMERY, a citizen of the United States, residing at East Orange, in the county of Essex and State of New Jersey, have invented new and useful Improvements in Welding-Controllers, of which the following is a specification.

This invention relates to welding controllers.

The electric arc used in arc welding is generally obtained by completing an electric circuit by means of welding electrodes and subsequently separating the electrodes to draw an arc. Various controllers have been devised for limiting the flow of current through the electrodes. It has been proposed to connect a resistance in the welding circuit to limit the flow of current and provide means to exclude the resistance when the welding current has decreased to a predetermined value to thereby increase the voltage across the arc to produce an arc of sufficient length and volume for welding purposes.

A controller employing an electromagnetic switch for excluding the resistance is described in a copending application of Tower and Van Nest, Serial No. 13,608, March 11, 1915. The electromagnetic switch in said controller is adapted to remain open when the initial current through its operating windings is high and to close when the current decreases to a predetermined value. The windings of the switch remain in whole or in part in the welding circuit during the welding operations. They are thus subjected to heavy current for a considerable length of time and consequently must be made heavy to prevent heating. This increases the size and adds to the expense of the controller.

The present invention relates more particularly to an improvement in the type of controller described in said application in which means is provided for holding the switch closed independently of the operating windings, said means being capable of accommodating the welding current at all times.

One of the objects of the invention is to provide an improved welding controller having means for holding its automatic switch closed independently of the switch operating windings.

Other objects and advantages of the invention will hereinafter appear.

The accompanying drawings illustrate an embodiment of the invention.

Figure 1 is a diagrammatic view of a welding controller embodying the invention.

Fig. 2 is a side view of the controller mounted on a switch board.

Fig. 3 is a front elevation of the controller switch board shown in Fig. 2.

The connection of the controller to the supply mains and the welding electrodes as illustrated in Fig. 1 will first be described.

Connected between the supply mains 1 and 2 are the electrodes 3 and 4. The electrode 3 constitutes the object upon which the welding operation is to be performed. The electrode 4 is movable so that it may be brought into engagement with the electrode 3 to complete the circuit and to be thereafter drawn away to strike an arc. The heat of the arc is used to weld a portion of the object 3. It is, of course, understood that the controller can be used with other forms of electrodes used to draw an electric arc.

The electrodes are normally connected across the mains in series with a starting resistance 5 and a steadying resistance 6. The circuit including the resistance 5 may be called for convenience the auxiliary or starting circuit. When the electrodes are brought into contact, the current flows through both resistances and is thereby limited to a safe value.

The starting resistance 5 is of relatively large value, its purpose being to limit the flow of current when the arc is started.

The steadying resistance 6 which is of relatively small value is used to steady the arc and to dampen abnormal fluctuations in the current after the starting resistance has been excluded.

As the electrodes are separated and the arc is drawn, the resistance of the arc increases and the flow of current consequently decreases. The resistance of the arc added to that of resistances 5 and 6 will generally not permit sufficient current to flow to produce an arc of the proper volume for welding purposes. It is therefore important that the resistance 5 be eliminated after the arc is drawn. For this purpose an automatic switch 7 is provided which when operated closes a circuit in shunt to the resistance 5. This circuit will be called for convenience the main or operating circuit. It contains a small adjustable resistance 8 for regulating the current to be used in welding.

The switch 7 is provided with two operating windings 9 and 10 which are connected in series with the electrodes and the starting resistance 5 in the starting circuit. The switch operating means is therefore responsive to the current in the auxiliary or starting circuit. In order to prevent the switch closing when the circuit is first completed by the electrodes, the switch is constructed so that when the initial current through its windings is high it remains open but when the current decreases to a predetermined value the switch closes.

During the welding operation a comparatively heavy current flows through the operating circuit. If the switch windings 9 and 10 were to remain in circuit they would be subjected to heavy current and would have to be built to accommodate it. If the windings be deënergized after the switch closes, the switch will automatically open since it is normally biased to open position. In order to prevent the windings 9 and 10 being subjected to heavy currents and at the same time keep the switch closed, an additional winding 11 is provided which is connected in the circuit in shunt to the resistance 5.

The winding 11 comprises a few turns of heavy copper strip of sufficient size to easily accommodate the welding current without heating. Accordingly when the switch closes the operating windings 9 and 10 are shunted and the winding 11 is energized to hold the switch closed. The welding current thereafter flows through the winding 11 and keeps the switch closed until the circuit is interrupted. When the arc between the electrodes is broken all the windings are deënergized and the switch automatically moves to open position. The controller thus returns to its initial position ready for another operation.

The construction of the switch 7 will now be described. The switch is shown in detail on the controller switch board in Figs. 2 and 3.

The switch has two operating windings 9 and 10 connected in series and magnetically independent. Winding 9 acts to close the switch and the winding 10 to hold it open. Mounted between the windings is a movable member 12 carrying a contact 13 which is adapted to engage a stationary contact 14. The upper part of the movable member constitutes an armature for the core of winding 9. The lower end of the movable member carries an armature 15 adapted to be attracted by the core of winding 10. The movable member is normally biased to open position as shown in Fig. 2.

In order that the switch remain open when an initially high current flows through the windings and close when the current decreases to a predetermined value, the windings are constructed so as to have different pull characteristics. The pull of winding 9 for closing the switch lags behind the current whereas the pull of the winding 10 for holding the switch open rises very quickly with an increase in current. Consequently when an initially high current is passed through the windings, the pull of the holding winding 10 increases more rapidly than that of the closing winding 9 and the switch remains open. As the current decreases the pull of the holding winding 10 decreases more rapidly than that of the closing winding 9 until a point is reached where the closing winding predominates over the holding winding and closes the switch.

The winding 11 for holding the switch closed after it has been operated is mounted on the core of winding 9 and connected to the stationary contact 14 and to the terminal 16, the latter being also connected to one end of th coil 9.

The switch is mounted on the controller board 17 together with the resistances 5 and 8 which are in the form of suitable rheostats controlled by adjustable handles 18 and 19. The controller elements may thus be grouped and connected together on a compact panel which may be easily transported. The controller can be quickly put into operation by merely connecting it to the supply line and to the electrodes.

It is to be understood that the structure shown is for the purpose of illustration only and that other structures may be devised which embody the invention and come within the spirit and scope of the appended claims.

What I claim is:—

1. An arc welding controller provided with a resistance adapted to be connected in the circuit of the arc, a switch for controlling said resistance, said switch having a closing and a holding winding in series with the resistance and arranged so that when the current through the resistance is initially high the switch is held open and when the current decreases to a predetermined value the switch is closed, and an additional winding for the switch to keep it closed independently of the closing and holding windings.

2. An electric welding system comprising a source of current supply, an auxiliary circuit for starting the welding arc, a main operating circuit adapted to be connected to the source of current supply, means directly responsive to the current in the auxiliary circuit for closing the main circuit when the current in the auxiliary circuit reaches a predetermined value, and means in the main circuit for maintaining said first-named means in circuit closing position.

3. An electric welding system comprising a source of current supply, an auxiliary circuit for starting the welding arc, a main operating circuit adapted to be connected to the source of current supply, a switch having electromagnetic operating means responsive to the current in the auxiliary circuit for closing the main circuit when the current in the auxiliary circuit reaches a predetermined value and electromagnetic means in the main circuit for keeping the switch closed independent of the operating means.

4. A welding system comprising a starting circuit for the welding arc adapted to be connected to a source of current supply, means in said circuit for limiting the current flow, a normally open operating circuit in shunt to said current limiting means, a switch in said shunt circuit having electromagnetic operating means responsive to the current in the starting circuit for keeping the switch open when the initial current is high and for closing it when the current decreases to a predetermined value to thereby close the shunt operating circuit and electromagnetic means responsive to the current in the shunt circuit for keeping the switch closed independently of the operating means.

5. A welding system comprising a starting circuit for the welding arc adapted to be connected to a source of current supply, current limiting means in said circuit, a normally open operating circuit in shunt to said current limiting means, a switch for controlling the shunt circuit, said switch having a closing and a holding winding in series in the starting circuit to hold the switch open when the initial current decreases to a predetermined value, and an additional winding for said switch responsive to the current in the shunt circuit for holding the switch closed independently of the other windings.

6. A welding system comprising a starting circuit for the welding arc adapted to be connected to a source of current supply, current limiting means in said circuit, a normally open operating circuit in shunt to said current limiting means, a lockout switch for controlling the shunt circuit, said switch having its windings responsive to the circuit in the starting circuit so that the shunt circuit remains open when the initial current in the starting circuit is high and is closed when the current decreases to a predetermined value, and electromagnetic means for said lockout switch responsive to the current in the shunt operating circuit for maintaining the switch closed independently of the operative windings.

7. A welding system comprising a starting circuit for the welding arc adapted to be connected to a source of current supply, current limiting means in said circuit, a magnetic switch having operating means responsive to the current in said starting circuit, an operating circuit adapted to be closed by said switch to exclude said current limiting means and the operating means of the switch, and means responsive to the current in the operating circuit for maintaining the switch closed after its operating means has been excluded.

In witness whereof I have hereunto subscribed my name in the presence of two witnesses.

T. D. MONTGOMERY.

Witnesses:
ALFRED J. KUTCHERA,
LAURA E. SMITH.

Copies of this patent may be obtained for five cents each, by addressing the "Commissioner of Patents, Washington, D. C."